(12) United States Patent
Serri et al.

(10) Patent No.: US 6,594,469 B1
(45) Date of Patent: Jul. 15, 2003

(54) METHODS AND APPARATUS FOR BROADCASTING REGIONAL INFORMATION OVER A SATELLITE COMMUNICATION SYSTEM

(75) Inventors: John Serri, Sunnyvale, CA (US); Michael J. Sites, Fremont, CA (US); Vijaya Gallagher, San Jose, CA (US)

(73) Assignee: Globalstar L.P., San Jose, CA (US)

( * ) Notice: Subject to any disclaimer, the term of this patent is extended or adjusted under 35 U.S.C. 154(b) by 439 days.

(21) Appl. No.: 09/650,513

(22) Filed: Aug. 29, 2000

(51) Int. Cl.[7] .............................. H04Q 7/20; H04Q 7/36
(52) U.S. Cl. ..................... 455/12.1; 455/13.3; 455/427; 455/428; 455/429; 455/430; 370/320; 370/335; 370/342; 370/315; 342/352; 342/354
(58) Field of Search ......................... 455/12.1, 13.3, 455/427, 428, 429, 430, 3.01, 3.02, 422, 550, 500, 403; 375/141; 370/316, 320, 315, 335, 342, 441; 342/352, 354

(56) References Cited

U.S. PATENT DOCUMENTS

| | | | |
|---|---|---|---|
| 5,303,286 A | 4/1994 | Wiedeman | 379/59 |
| 5,422,647 A | 6/1995 | Hirshfield et al. | 342/354 |
| 5,448,623 A | 9/1995 | Wiedeman et al. | 379/59 |
| 5,526,404 A | 6/1996 | Wiedeman et al. | 379/60 |
| 5,552,798 A | 9/1996 | Dietrich et al. | 343/893 |
| 5,619,525 A | 4/1997 | Wiedeman et al. | 375/200 |
| 5,664,006 A | 9/1997 | Monte et al. | 455/405 |
| 5,697,050 A | 12/1997 | Wiedeman | 455/12.1 |
| 5,758,260 A | 5/1998 | Wiedeman | 455/12.1 |
| 5,787,336 A | 7/1998 | Hirshfield et al. | 455/13.4 |
| 5,884,142 A | 3/1999 | Wiedeman et al. | 455/12.1 |
| 5,896,558 A | 4/1999 | Wiedeman | 455/12.1 |
| 5,966,371 A * | 10/1999 | Sherman | 455/12.1 |
| 5,999,623 A | 12/1999 | Bowman et al. | 380/20 |
| 6,067,442 A | 5/2000 | Wiedeman et al. | 455/13.1 |
| 6,085,067 A | 7/2000 | Gallagher et al. | 455/13.1 |
| 6,201,961 B1 * | 3/2001 | Schindall et al. | 455/12.1 |
| 6,317,583 B1 * | 11/2001 | Wolcott et al. | 455/12.1 |

\* cited by examiner

*Primary Examiner*—William Trost
*Assistant Examiner*—Keith Ferguson
(74) *Attorney, Agent, or Firm*—Ohlandt, Greeley, Ruggiero & Perle, L.L.P.

(57) ABSTRACT

In a communication satellite constellation which uses CDMA and multiple spot beams for point-to-point communication, a system is provided for broadcasting regionally related information within a spot beam by establishing a Frequency/Walsh Code Tiling over the Earth's surface, and enabling a user terminal at a given position to tune to an appropriate frequency and Walsh Code to receive the information broadcast from a satellite over a forward beam downlink. The information, e.g. regional messages such as local weather or traffic, is transmitted to the satellite from a ground station or gateway that receives the information from a Broadcast Processing Center. In a preferred embodiment a dedicated Frequency Division Multiplex (FDM) channel within each spot beam transmits the regional broadcast messages at the Tiles in accordance with the Walsh Code designations of the Tiles.

12 Claims, 4 Drawing Sheets

METHODS AND APPARATUS FOR BROADCASTING REGIONAL INFORMATION OVER A SATELLITE COMMUNICATION SYSTEM

FIELD OF THE INVENTION

This invention relates to earth satellite communication systems and, more particularly, to a system for broadcasting regional information over a satellite communication system.

BACKGROUND OF THE INVENTION

Mobile satellite communication systems are used for transmitting point-to-point voice and data communications using a constellation of satellites, such as low earth orbit (LEO)) or medium earth orbit (MEO) satellite constellations. Such systems may include a number of user terminals, several terrestrial ground stations or gateways, and a number of satellites for bi-directionally coupling the user terminals to terrestrial telecommunication networks, such as the Public Switched Telephone Network (PSTN), and the Internet via the gateways.

The point-to-point communications are generally those conducted between a single one of the user terminals and another user terminal, or a terrestrial wired or wireless telephone, or a data processor modem (for data calls as opposed to voice calls.)

Known in this regard are satellite communication systems with satellites having multi-beam antennas that are used to produce multiple spot beams to illuminate particular areas on the Earth. Specifically, a satellite receives a Forward Beam Uplink from a communication gateway and provides a number of Forward Beam Downlinks, by means of the spot beams, over a defined footprint area on the ground. Such a system can be used to facilitate the transmitting of point-to-point communications between satellite user terminals and other terminals and telephones around the world.

While point-to-point communication links are very important, it would also be desirable to provide a point-to-multipoint or broadcast capability, particularly on a regional basis, as this would enable important local information, such as weather, traffic, addresses of local services and vendors, and emergency information, to be provided simultaneously to a number of user terminals. This regional content can be broadcast as audio messages or as data messages to be displayed on the user terminal.

OBJECTS AND ADVANTAGES OF THE INVENTION

It is thus an object and advantage of this invention to fully utilize the capabilities of a modern mobile satellite communication system by providing an ability to also broadcast regionally related information.

It is a further object and advantage of this invention to disseminate broadcast information based on a Static Orthogonal Code Tiling Technique that separates a broadcast services from point-to-point communication services that make Duse of the same satellite system.

SUMMARY OF THE INVENTION

The present invention is directed to fully utilizing the capabilities of a communication satellite constellation, in particular one that uses Code Division, Multiple Access (CDMA) and multiple spot beams, by providing an ability to broadcast regionally related information within a satellite spot beam. The broadcast of the regionally related information can be made on a scale of the beam spot size divided by the number of orthogonal spreading codes (e.g., Walsh Codes) and the frequencies available for use.

More particularly, the invention uses a simplifying scheme to disseminate broadcast information based on a Static Orthogonal Code Tiling Technique that separates the broadcast services from the point-to-point communication services, and make use of the same satellite system. Each broadcast region may be on the order of 1% of the satellite beam size. The technique involves a static Frequency/Walsh Code tiling over the Earth's surface, and a user terminal at a given position tunes to an appropriate (for that location) predetermined frequency and Walsh Code to receive information broadcast from a satellite over a forward beam downlink. The gateway first receives the broadcast information, such as regional traffic messages, from a ground-based entity referred to herein for convenience as a Broadcast Processing Center. The methods of implementation of the Broadcast Processing Center are varied and not particularly germane to the invention described in this patent application.

A dedicated Frequency Division Multiplex (FDM) channel of a CDMA-based system is preferred to be used to disseminate the regionally dependent messages from the gateways to the user terminals. The use of the dedicated FDM channel eliminates much of the synchronization and power control that would be required from sharing a frequency channel with a system used for point-to-point communications. This technique thus avoids the need for a pilot signal, as the user terminal has a priori knowledge of the required frequency and code pair required to access the desired broadcast channel(s), and the resulting system can co-exist with a point-to-point, call-by-call communication system, and may make use of the same satellite constellation and ground infrastructure.

A method is disclosed for operating a satellite-based telecommunications system. The method includes steps of: (A) tiling at least a portion of the surface of the Earth in accordance with a static Frequency/Walsh Code tiling; (B) storing information descriptive of the tiling; (C) operating a satellite user terminal so as to determine its current location; (D) associating the current location of the user terminal with a Frequency/Walsh Code, based on the stored information; and (E) further operating the satellite user terminal to acquire, using the Frequency/Walsh Code, a desired broadcast communication signal that is transmitted in a satellite forward downlink beam.

For a non-geosynchronous satellite case, wherein the satellite forward link beam moves relative to a point on the ground, the method further includes a step of handing off at least the Walsh Code from the first satellite forward downlink beam to a second satellite forward downlink beam due to motion of the first satellite forward downlink beam away from the current location of the user terminal.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
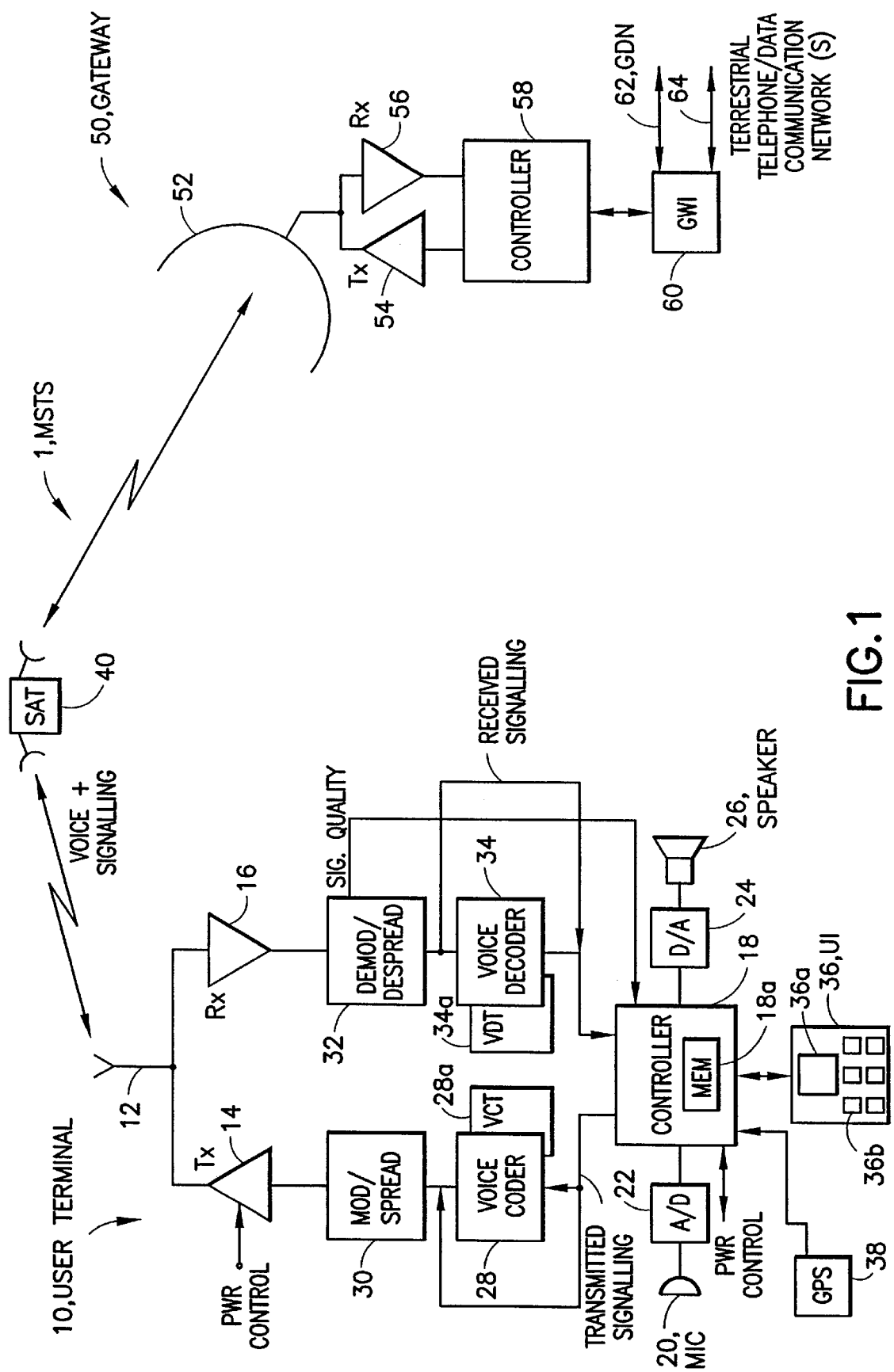
FIG. 1 is a simplified block diagram of a digital wireless telecommunications system, embodied as a mobile satellite telecommunications system, that is suitable for practicing this invention.

Reference is first made to FIG. 1 for illustrating a simplified block diagram of a digital wireless telecommunications system, embodied herein as a mobile satellite telecommunications system (MSTS) 1, that is suitable for practicing this invention.

The MSTS 1 includes at least one, but typically many, wireless user terminals (UTs) 10, at least one, but typically several, communications satellite 40, and at least one, but typically several, communications ground stations or gateways 50.

Reference in this regard can be had, by example, to U.S. Pat. No. 5,526,404, "Worldwide Satellite Telephone System and a Network Coordinating Gateway for Allocating Satellite and Terrestrial Resources", by Robert A. Wiedeman and Paul A. Monte; to U.S. Pat. No. 5,303,286, "Wireless Telephone/Satellite Roaming System", by Robert A. Wiedeman; to U.S. Pat. No. 5,619,525, "Closed Loop Power Control for Low Earth Orbit Satellite Communications System, by Robert A. Wiedeman and Michael J. Sites; and to U.S. Pat. No. 5,896,558 "Interactive Fixed and Mobile Satellite Network", by Robert A. Wiedeman, for teaching various embodiments of satellite communications systems, such as low earth orbit (LEO) satellite systems, that can benefit from the teachings of this invention. The disclosures of these various U.S. Patents are incorporated by reference herein in their entireties, in so far as they do not conflict with the teachings of this invention.

The exemplary UT 10 includes an antenna 12 for transmitting and receiving RF signals and a RF transmitter (TX) 14 and a RF receiver (RX) 16 having an output and an input, respectively, coupled to the antenna 12. A controller 18, which may include one or more microprocessors and associated memories 18a and support circuits, functions to control the overall operation of the UT 10. An input speech transducer, typically a microphone 20, provides a user's speech signals to the controller 18 through a suitable analog to digital (A/D) converter 22. An output speech transducer, typically including a loudspeaker 26, outputs received speech signals from the controller 18, via a suitable digital to analog (D/A) converter 24. The UT 10 will also typically comprise some type of user interface (UI) 36 that is coupled to the controller 18, such as a LCD display 36a and a keypad 36b.

A transmit path includes a desired type of voice coder (vocoder) 28 that receives a digital representation of the input speech signals from the controller 18, and includes voice coder tables (VCT) 28a and other required support circuitry, as is well known in the art. The output of the vocoder 28, which is a lower bit rate representation of the input digital speech signals or samples, is provided to a RF modulator (MOD) 30 for modulating a RF carrier, and the modulated RF carrier is upconverted to the transmission frequency and applied to the input to the RF transmitter amplifier 14. Signaling information to be transmitted from the UT 10 is output from the controller 18 to a signaling path that bypasses the vocoder 28 for application directly to the modulator 30. For the purposes of this invention the modulator 30 is assumed to also perform spectral spreading of the transmitted signal using a pseudonoise (PN) code, such as a Walsh code. Other operations can also be performed on the transmitted signal, such as Doppler pre-correction, interleaving, and other well known operations.

A receive path includes the corresponding type of voice decoder 34 that receives a digital representation of a received speech signal from a corresponding type of demodulator (DEMOD) 32. For the purposes of this invention the demodulator 32 is assumed to also perform despreading of the received signal using a second PN code, again typically a Walsh code. The voice decoder 34 includes voice decoder tables (VDT) 34a and other required support circuitry, also as is well known in the art. The output of the voice decoder 34 is provided to the controller 18 for audio processing, and is thence sent to the D/A converter 24 and the loudspeaker 26 for producing an audible voice signal for the user. As with the transmitter path, other operations can be performed on the received signal, such as Doppler correction, deinterleaving, and other well known operations. In a manner analogous to the transmit path, received signaling information is input to the controller 18 from a signaling path that bypasses the voice decoder 34 from the demodulator 32.

The RF signals transmitted from the UT 10 and those received by the UT 10 pass through at least one satellite 40, which may be in any suitable altitude and orbital configuration (e.g., circular, elliptical, equatorial, polar, etc.) In the preferred embodiment the satellite 40 is one of a constellation of Low Earth Orbit (LEO) satellites, although one or more Medium Earth Orbit (MEO) satellites could be used, as could one or more geosynchronous orbit satellites. The satellite 40 may be a bent pipe type of repeater satellite, or it may provide on-board signal processing wherein a received transmission is at least partially demodulated to baseband, processed in some way on the satellite, remodulated and then transmitted. The satellite is assumed, for the purposes of this invention, to be capable of transmitting to the ground a plurality of beams, as will be described in further detail below.

The satellite 40 serves to bi-directionally couple the UT 10 to the gateway 50. The gateway 50 includes a suitable RF antenna 52, such as steerable parabolic antenna, for transmitting and receiving a feederlink with the satellite 40. The feederlink will typically include communication signals for a number of UTs 10. The gateway 50 further includes a transceiver, comprised of transmitters 54 and receivers 56, and a gateway controller 58 that is bi-directionally coupled to a gateway interface (GWI) 60. The GWI 60 provides connections to a Ground Data Network (GDN) 62 through which the gateway 50 communicates status, frequency, power coordination, and usage statistics with a ground operations control center (not shown) and possibly other gateways. The GWI 60 also provides connections to one or more terrestrial telephone and data communications networks 64, such as the Public Switched Telephone Network (PSTN), whereby the UT 10 can be connected to any wired or wireless telephone, or to another UT, through the terrestrial telecommunications network. The gateway 50 also includes banks of modulators, demodulators, voice coders and decoders, as well as other well known types of equipment, which are not shown to simplify the drawing.

Figure 2:
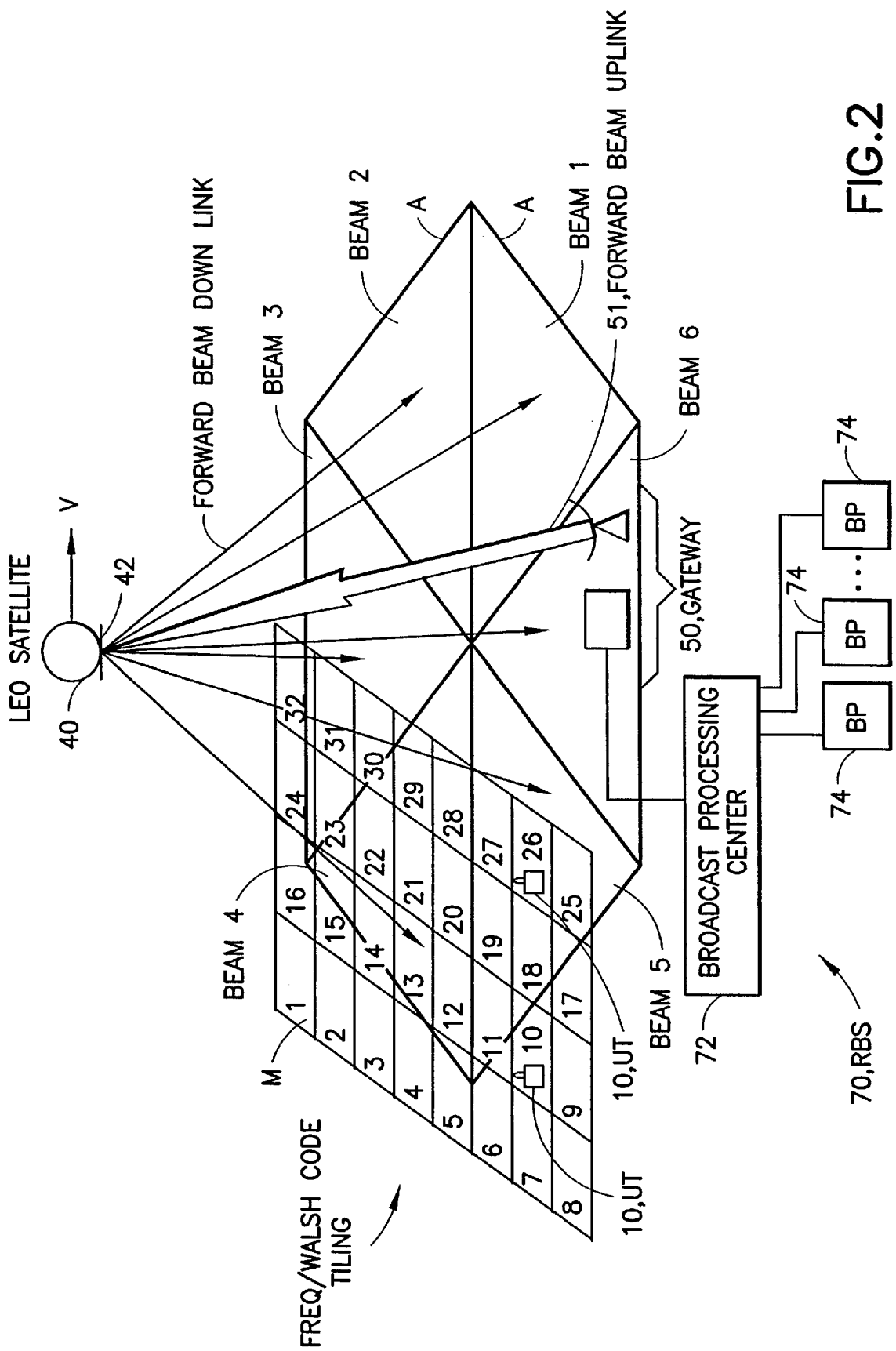
FIG. 2 is a diagrammatic illustration of the elements of a regional broadcasting system in accordance with the invention.

A Broadcast Processing Center (BPC) 72, as shown in FIG. 2, is also coupled to the gateway 50 for providing broadcast content thereto for transmission via at least one satellite 40 to a plurality of the user terminals 10, as will be described in further detail below. It is assumed that at least one, but typically several, Broadcast Providers (BPs) 74 provide broadcast content or information to the BPS 72. Individual ones of the BPs 74 could provide, by example, weather reports, traffic reports, regional or local points of interest, locations of hotels and restaurants, and financial information.

Having thus described one suitable but not limiting embodiment of a mobile satellite telecommunications system that can be used to practice this invention, reference is now made to FIG. 2 for illustrating a technique to fully utilize the capabilities of the MSTS 1. The MSTS 1 is assumed to employ code division, multiple access (CDMA) waveforms for point-to-point transmissions, and multi-beam satellite antennas to produce multiple Earth-illuminating spot beams.

This invention provides an ability to broadcast regionally related information on a satellite spot beam, and provides a Regional Broadcast System (RBS) 70, which co-exists with and operates simultaneously with the point-to-point telecommunications operations of the MSTS 1.

That is, the Regional Broadcast System 70 can co-exist with the point-to-point, call-by-call communication system embodied in the MSTS 1, and can make use of the same satellite constellation and ground infrastructure.

The invention arises out of an appreciation by the inventors that the multiple spot beams used to illuminate the Earth from satellite communications systems have the ability to broadcast regionally pertinent or dependent information. The regionally dependent information is broadcast on the scale of the satellite beam spot size, divided by a number of orthogonal PN spreading codes (assumed for this invention to be Walsh Codes) and frequencies that are available for use.

Accordingly, a fixed or static Frequency/Walsh Code tiling over the Earth's surface is developed whereby a user terminal 10 at a given position tunes to an appropriate predetermined frequency and Walsh Code pair to receive regionally related information that is broadcast from a satellite 40 that has received the broadcast information from a gateway 50. The gateway 50 may in turn receive regionally dependent information or messages from an entity that is referred to herein as the above-mentioned Broadcast Processing Center (BPC) 72, possibly along with associated designated frequencies and Walsh Codes for transmission to the satellite 40. This technique avoids the need for a pilot signal, thereby conserving bandwidth and power.

The teachings of this invention thus utilize a dedicated Frequency Division Multiplex (FDM) channel in the CDMA-based MSTS 1 to disseminate information, such as regionally dependent messages, by broadcasting the information on the FDM channel, within a forward downlink spot beam, to the user terminals 10 within that spot beam. Such use of the dedicated FDM channel eliminates most of the synchronization and power control considerations that would be required if one were sharing a frequency channel with a system used for point-to-point communications. The use of the dedicated FDM channel thus decouples the RBS 70 from the point-to-point MSTS 1, thereby minimizing interfaces between the two systems. The minimization of the interfaces is important in simplifying the means of revenue collection and administration of the RBS 70. The teachings of this invention also employ the same CDMA waveform used by the point-to-point MSTS 1, thus minimizing the required regulatory approvals. In a preferred, but not limiting, embodiment of this invention the RBS 70 interfaces to the MSTS 1 at the IF (intermediate frequency) level of the gateway 50.

By way of example, a presently preferred embodiment of the invention is illustrated in FIG. 2, wherein the LEO satellite 40 is shown to include a downlink antenna 42 for producing six beam spots (Beam 1–Beam 6), each covering a generally triangular area (A) on the ground. This particular beam pattern or footprint, comprising the six triangular sub-beams as shown in FIG. 2, is used for illustrative purposes only, as it will be appreciated that the teachings of this invention may be implemented using a variety of shaped antenna beam patterns, including both circular and elliptical spot beam patterns.

A further pattern of regions or "tiles" is established on the ground, each of area M, and this pattern is illuminated by the forward beam downlinks from the satellite 40. Within any Area A of a spot beam several Tiles may be illuminated at any instant. Each spot beam downlink typically comprises a set of transmission channels or sub-channels that are distinguished from one another according to transmission frequency. In accordance with the teachings of this invention at least one of these sub-channels is dedicated for use in broadcasting regional messages to user terminals 10 located within the spot beam. Each sub-channel may also have one or more assigned pseudo-random (PN) orthogonal codes. With this scheme, the system may be used to transmit appropriate information within a spot beam on appropriate sub-channels, with each sub-channel corresponding to a separate PN orthogonal code, e.g., a Walsh Code. Also, each Tile may be assigned an appropriate code, by virtue of its location, and that code may be related to the spot beam code. On average, the number of Tiles illuminated by a beam spot is on the order of A/M, and thus the average number of Walsh Codes to be used is on the order of A/M. As such, it can be appreciated that the size of the Tiles is inversely proportional to the available number of Walsh Codes that can be used in a given frequency. The exemplary set of Tiles shown in FIG. 2 range from Tile 1 to Tile 32. Each Tile or broadcast region is on the order of, by example, 1% of the satellite beam size.

As seen in FIG. 2, satellite Beam 3 illuminates Tiles 23, 24, 30, 31 and 32, while user terminals 10 are located in Tiles 10 and 26. The gateway 50 sends instructions and messages, by means of a Forward Beam Uplink 51, to the satellite 40. Regionally pertinent information and messages to be broadcast are supplied to the gateway 50 by the Broadcast Processing Center 72 that is associated with the gateway 50.

By virtue of the movement of satellite 40, the satellite spot beams are moving in a direction V, so that, for example, Beam 3 is moving out of Tile 30, while Beam 4 is moving in. The gateway 50, by virtue of the associated instructions transmitted with the regional messages, will accordingly operate to assign the Walsh Code corresponding to Tile 30 from Beam 3 to Beam 4 when the beam-to-beam handover is completed. For the transition period the gateway 50 assigns this Walsh Code to both Beams 3 and 4, and subsequently unassigns the Walsh Code as required. The user terminals 10 receiving the broadcast information are thus not required to retune or resynchronize their receivers 16 to continue receiving the broadcast information. Satellite-to-satellite handovers are also accomplished as needed.

The regional information will typically vary from Area to Area in accordance with the downlink sub-beam containing the broadcast information, and will be received in accordance with the Tile in which the user terminal 10 resides. Hence, the regional information is transmitted on the basis of the Tile to which it is being transmitted.

It is within the scope of the invention to provide the same broadcast information to more than one Tile, which may be adjacent Tiles or non-adjacent Tiles, and to as many as all of the Tiles.

If one assumes that the MSTS 1 operates with a constellation comprised of numerous satellites 40 with overlapping footprints, the RBS 70 provides the capability of using more than one satellite 40 at any time to illuminate a given Area, and to gain the benefits of diversity combining within the user terminals 10. For simplicity, FIG. 2 shows only one LEO satellite 40 with Forward Beam Downlinks illuminating a portion of the Tiles, but it should be understood that this embodiment can be extended to encompass a plurality of satellites 40 covering the same area at the same point in time. The use of overlapping beams from various satellites 40 can be used to improve the connectivity of the user terminal 10 to the gateway 50 by providing additional paths. Therefore, if one path were to be blocked by an obstruction, another path would still be available.

In the preferred embodiment of the invention the assignment of frequencies and Walsh Codes to Tiles, across the world, is static, i.e., does not change over time, and has a one-to-one correspondence with Tiles.

In one embodiment the user terminal 10 is assumed to include Global Positioning System (GPS) receiver 38 (see FIG. 1) or some other position location mechanism of sufficient accuracy determine what Tile(s) it is in or closest to. For those systems wherein a gateway 50 performs a position location on the user terminal 10, the user terminal's position can be transmitted to the user terminal for use in determining what the appropriate frequency/code pair is to access the desired broadcast information. This can be done with a table lookup procedure using data stored in the memory 18a. Alternatively, it is within the scope of the teaching of this invention for gateway 50, after position locating the user terminal 10, to transmit information descriptive of which regional area or Tile the user terminal 10 is located in, and/or to simply transmit the required frequency/code pair(s) to access the broadcast information channel(s).

In any case, the UT 10, based on it's initial position as obtained internally or externally, tunes its receiver 16 to the predetermined frequency channel and then synchronizes to the predetermined orthogonal PN code in order to receive the broadcast message(s) relevant to the Tile that the UT 10 currently resides in, and which the UT 10 is authorized to receive.

Figure 3:
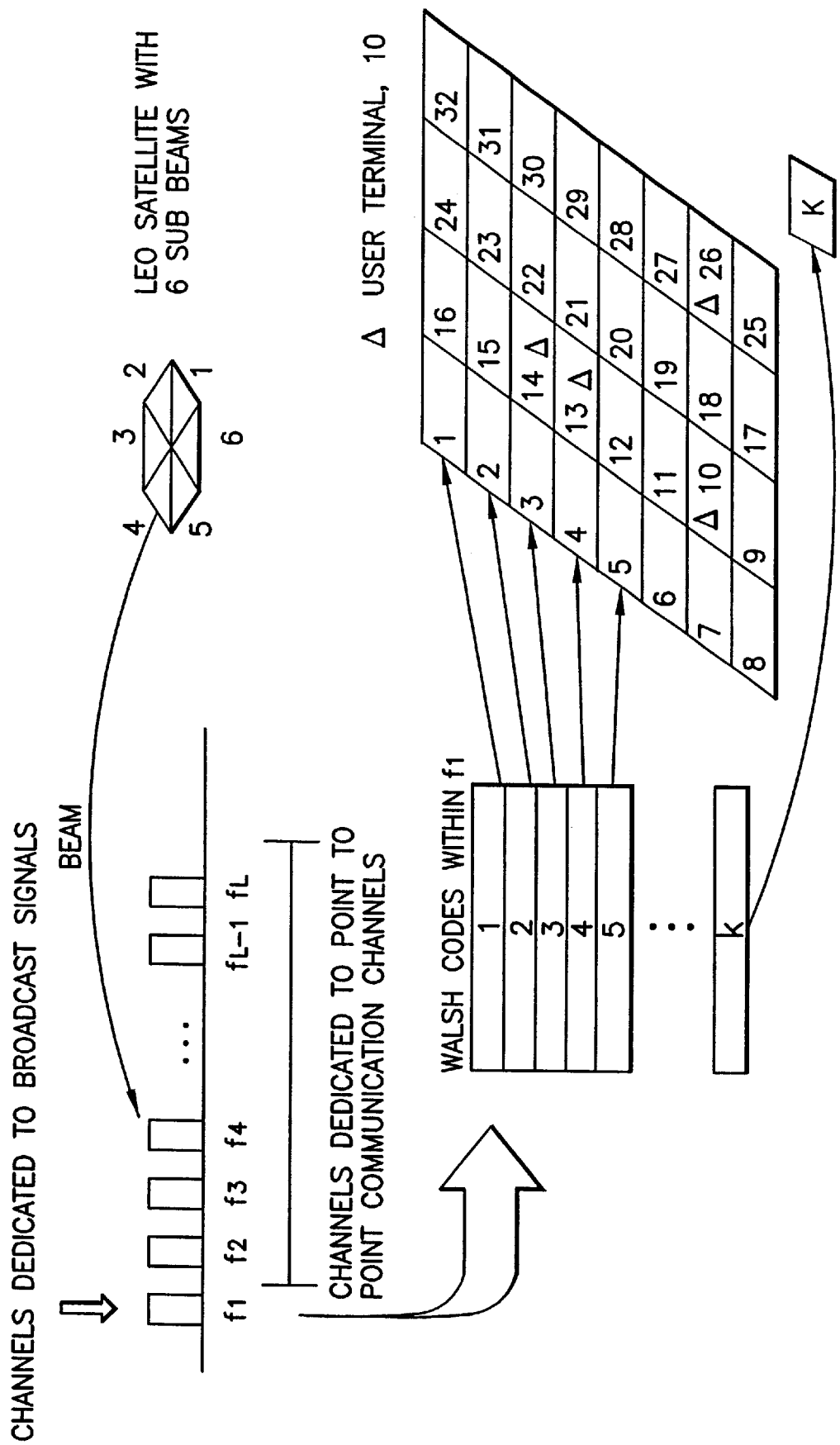
FIG. 3 illustrates an example of an allocation scheme of a forward link from a satellite showing dedicated channels, Walsh Codes, and frequencies as used in accordance with the teaching of this invention.

FIG. 3 shows the Walsh Code allocation scheme for a dedicated FDM channel, f1, in a forward link beam according to the invention. The presently preferred static Walsh Code assignment allows a user terminal 10 to contain a mapping of Tiles to Walsh Codes, such as by storing the mapping in the memory 18a. While the Walsh Code to Tile relationship is preferably one-to-one, a re-use of Walsh Codes is made possible over distances greater than the extent of the footprint of the largest satellite beam spot. In any case, within a certain geographical region that is smaller than the largest spot beam footprint size, the Walsh Code assignment can be assumed to provide a unique code to each Tile. The Broadcast Processing Center 72, via the gateway 50, may transmit over each satellite 40 using all of the Walsh Codes covered by the satellite beams.

A dynamic assignment of Walsh Codes to satellite beams, while not presently preferred, can be accomplished on a predicted, scheduled basis, as the orbits and orientation of the satellites 40 are known with great precision.

One example of the possible numerous methods that exist for administering the RBS 70 is as follows. It is assumed that the RBS 70 can use encryption on the forward link. Users may subscribe to the RBS 70 on a periodic basis, for example, monthly, and are then furnished decryption keys disseminated by the Broadcast Provider 74 to valid/paying subscribers. The decryption keys may be disseminated through in-band satellite transmission, or by any suitable technique. New keys may be distributed on a periodic basis, once a month for instance, and old keys may become invalid after some period of time set by the Broadcast Provider 74. Those user terminals 40 that possess a valid key operate in a receive only mode, and successfully decrypt the broadcast messages. Billing may be done on a subscription basis, where the user would be invoiced periodically, e.g., monthly.

Despite the clear frequency separation presented by this technique, power usage allocation coordination between the Broadcast Provider 74 and the communication service provider of the MSTS 1 is carried out. This coordination is important, as the satellite 40 is a shared resource that has limits with respect to the power it can deliver at any instant, and further with respect to the amount of energy that it can deliver for transmission purposes over the time frame of the order of a number of orbital periods. The latter is dependent on the state of charge of the satellite 40, on its orbital/attitude position with respect to the sun, the charging capacity of its solar cells, as well as a number of other factors. The actual allocation function is carried out by the Satellite/System Operator, with specific instructions being furnished for giving the maximum power than can be used over any FDM channel as a function of time. The Satellite/System Operator also sends the orbital/alignment FDM channel as a function of time, and the orbital/alignment information for each satellite in use, to the BPS 72 so that the BPS 72 can assign the Walsh Codes used by each satellite 40, and by each beam, as a function of time.

Power Control can be accomplished by a variety of methods. If one assumes that the desired service is a broadcast service only, and since the relative position of the spot beam with respect to a location on the Earth at any time is predetermined, the power allocated to the beam at a given instant of time can be calculated and scheduled into the gateway 50. In those cases where the downlink frequency band may be somewhat sensitive to rain fade and other effects, it may be desirable to use a closed loop power control mechanism. Techniques for performing power control of a CDMA Satellite system, for example by using a reference user terminal, are known.

Applications of the invention include using the system for broadcasting, by example, local weather, traffic, special events, and news information. The invention also has important an application where transmitting messages with a minimal delay time is desirable, such as for emergency services wherein police, fire, and rescue operations must be contacted quickly. As was stated above, the teachings of this invention may be implemented with LEO, MEO, or GEO satellites. In some applications, one orbit may be preferred over others. For example, when it is desired to disseminate high resolution position location information, the short propagation times offered by a LEO satellite (<150 msec.) result in achieving greater accuracy of the position and velocity of the receiving user terminal 10 than can be achieved through transmission via a geosynchronous satellite.

It should be noted that while the invention has been described with respect to beam patterns on the ground, partitioning or tiling the ground with Frequency/Walsh Code pairs, etc., the term "ground" is meant to be synonymous with the surface of the Earth, and thus can also encompass bodies of water. Vertical extensions from the surface of the Earth are also contemplated. As such, user terminals 10 located on ships at sea, as well as within aircraft, may benefit from the teachings of this invention, and are enabled to receive desired broadcast information from one or more of the BPs 74.

Figure 4:
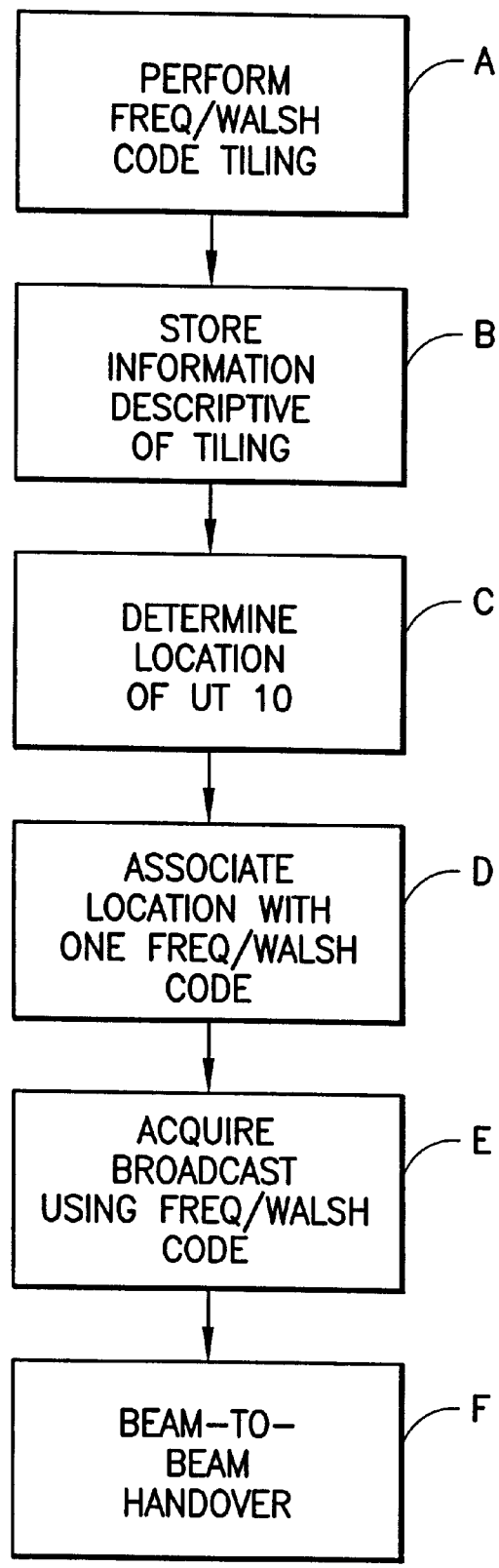
FIG. 4 is a logic flow diagram of a method in accordance with the teachings of this invention.

Referring to FIG. 4, it can be appreciated that a method is disclosed for operating a satellite telecommunications system, such as the MSTS 1. The method includes steps of:

(A) tiling at least a portion of the surface of the Earth in accordance with a static Frequency/Walsh Code tiling; (B) storing information descriptive of the tiling (such as in the user terminal 10 and/or in the gateway 50); (C) operating the satellite user terminal 10 so as to determine its current location (based on internally and/or externally generated information); (D) associating the current location of the user terminal 10 with a Frequency/Walsh Code, based on the stored information; and (E) further operating the satellite user terminal to acquire, using the Frequency/Walsh Code, a desired broadcast communication signal that is transmitted in a satellite forward downlink beam.

For a non-geosynchronous satellite case (e.g. LEO or MEO), wherein the satellite forward link beam moves relative to a point on the ground, the method further includes a Step F of handing off at least the Walsh Code from the first satellite forward downlink beam to a second satellite forward downlink beam due to motion of the first satellite forward downlink beam away from the current location of the user terminal.

While the invention has been particularly shown and described with respect to preferred embodiments thereof, it will be understood by those skilled in the art that changes in form and details may be made therein without departing from the scope and spirit of the invention.

What is claimed is:

1. A broadcast communication system, comprising:
   at least one satellite;
   at least one ground station for transmitting an uplink communication signal to said at least one satellite;
   at least one broadcast information source having an output coupled to said at least one ground station for providing information to be broadcast thereto; and
   a controller for assigning and unassigning codes to beams for handing over a particular broadcast region from one beam to another beam,
   wherein said at least one satellite transmits a downlink communication signal comprised of a plurality of beams each having a beam coverage area on the ground, individual ones of said beams being capable of simultaneously conveying at least one broadcast communication and at least one point-to-point communication; and
   wherein the ground is partitioned into a plurality of broadcast regions each of which is assigned an associated predetermined frequency and code that are a subset of a larger set of frequencies and codes used for point-to-point communications within the beam coverage areas.

2. A broadcast communication system as in claim 1, and further comprising at least one user terminal comprising a single receiver for receiving one of a broadcast communication or a point-to-point communication, said user terminal further comprising a memory for storing data descriptive of the assigned predetermined frequency and code for individual ones of said broadcast regions.

3. A broadcast communication system as in claim 1, and further comprising means for determining a current location of the user terminal, and a controller in said user terminal for associating the current location with a frequency and code that are assigned to the broadcast region that contains the current location of the user terminal.

4. A broadcast communication system as in claim 1, wherein said codes are comprised of Walsh Codes.

5. A broadcast communication system as in claim 1, wherein a particular frequency contains a plurality of said codes.

6. A broadcast satellite based telecommunication system, comprising:
   a plurality of user terminals;
   a constellation of non-geosynchronous satellites individual ones of which exhibit motion with respect to a point on the ground;
   at least one ground station for transmitting an uplink communication signal to satellites in view of said ground station; and
   at least one broadcast information source having an output coupled to said at least one ground station for providing broadcast content information thereto;
   wherein individual ones of said satellites transmit a downlink user terminal communication signal comprised of a plurality of beams each having a beam coverage area on the ground, individual ones of said beams being capable of simultaneously conveying at least one broadcast communication to one user terminal in a first frequency channel and at least one point-to-point communication with another user terminal in one of a plurality of second frequency channels;
   wherein within a particular geographical area the ground is partitioned into a plurality of broadcast regions which are collectively assigned to said first frequency channel, wherein individual ones of said broadcast regions are individually assigned to an individual one of a plurality of pseudo-noise codes; and
   further comprising a gateway controller for performing beam-to-beam handovers of said broadcast regions due to motion of said beams over the ground.

7. A system as in claim 6, wherein said user terminal comprises a single receiver for receiving one of a broadcast communication or a point-to-point communication, said user terminal further comprising a memory for storing data descriptive of at least a mapping of pseudo-noise codes to said individual ones of said broadcast regions.

8. A system as in claim 7, and further comprising means for determining a current location of the user terminal, and a controller in said user terminal, responsive to said stored data, for determining at least a pseudo-noise code that is assigned to the broadcast region that contains the determined location of the user terminal.

9. A system as in claim 6, wherein said codes are comprised of Walsh Codes.

10. A system as in claim 6, wherein a particular frequency channel has a plurality of pseudo-noise codes.

11. A method for operating a satellite-based telecommunications system, comprising steps of:
    tiling at least a portion of the surface of the Earth with a static Frequency/Walsh Code tiling;
    storing information descriptive of the tiling;
    operating a satellite user terminal so as to determine its current location;
    associating the current location of the user terminal with a Frequency/Walsh Code, based on the stored information; and
    further operating the satellite user terminal to acquire, using the Frequency/Walsh Code, a desired broadcast communication signal that is transmitted in a first satellite forward downlink beam.

12. A method as in claim 11, wherein the satellite forward link beam moves relative to a point on the ground, and further comprising a step of handing off at least the Walsh Code from the first satellite forward downlink beam to a second satellite forward downlink beam due to motion of the first satellite forward downlink beam away from the current location of the user terminal.

* * * * *